US012730493B2

(12) United States Patent
Tan et al.

(10) Patent No.: US 12,730,493 B2
(45) Date of Patent: Sep. 8, 2026

(54) MECHANISM TO OVERRIDE STANDBY POWER IN LARGE MEMORY CONFIGURATION OF WORKSTATIONS TO ELIMINATE THE NEED TO INCREASE POWER OF STANDBY POWER RAIL

(71) Applicant: Intel Corporation, Santa Clara, CA (US)

(72) Inventors: Chuen Ming Tan, Bayan Lepas (MY); Venkataramani Gopalakrishnan, Folsom, CA (US); Aneesh Tuljapurkar, Bangalore (IN); Vishwanath Somayaji, Bangalore (IN); Tabassum Yasmin, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/077,131

(22) Filed: Dec. 7, 2022

(65) Prior Publication Data

US 2024/0192755 A1 Jun. 13, 2024

(51) Int. Cl.
*G06F 1/3225* (2019.01)
*G06F 1/3287* (2019.01)

(52) U.S. Cl.
CPC .......... *G06F 1/3225* (2013.01); *G06F 1/3287* (2013.01)

(58) Field of Classification Search
CPC ............................ G06F 1/3225; G06F 1/3287
USPC .......................................................... 713/320
See application file for complete search history.

(56) References Cited

U.S. PATENT DOCUMENTS 5,954,820 A * 9/1999 Hetzler ................. G06F 1/3203 713/323
6,008,665 A * 12/1999 Kalb ................... H04L 25/0278 326/86
6,031,752 A * 2/2000 Lai ........................ G06F 13/409 365/63
6,330,639 B1 * 12/2001 Fanning ................ G06F 1/3203 713/320
6,560,713 B1 * 5/2003 Chary ..................... G06F 1/263 713/340
7,788,421 B1 * 8/2010 Heath ....................... G06F 1/20 710/17
7,962,775 B1 * 6/2011 Vaidyu .................. G06F 1/3203 713/323
2004/0268166 A1 * 12/2004 Farkas .................. G06F 1/3203 713/320
2005/0044440 A1 * 2/2005 Barr .......................... G06F 1/08 713/500

(Continued)

*Primary Examiner* — Paul R. Myers
(74) *Attorney, Agent, or Firm* — Schwabe, Williamson & Wyatt, P.C.

(57) ABSTRACT

Embodiments herein relate to a circuit which allows the re-use of an existing power supply units having main power rails and an auxiliary power rail, while supporting large memory configurations in a sleep state to avoid data loss. A processor determines whether a power requirement of memory modules in a computing device exceeds an available power of the auxiliary power rail. If this is the case, the processor asserts an override signal which is used by a logic circuit to force the power supply to remain on in the sleep state. A set of switches disconnect the main rails from other components which can be turned off in the sleep state. A select circuit selects one of the main rails to power the memory modules.

19 Claims, 10 Drawing Sheets

(56) References Cited

U.S. PATENT DOCUMENTS

| | | | | |
|---|---|---|---|---|
| 2005/0240786 | A1* | 10/2005 | Ranganathan | G09G 3/3208 713/320 |
| 2008/0104430 | A1* | 5/2008 | Malone | G06F 1/3203 713/300 |
| 2009/0079265 | A1* | 3/2009 | Seligman | A61N 1/36038 307/48 |
| 2009/0210401 | A1* | 8/2009 | Kaufman, Jr. | G06F 16/245 |
| 2009/0300386 | A1* | 12/2009 | Archer | G06F 1/3203 713/320 |
| 2011/0185208 | A1* | 7/2011 | Iwamoto | G11C 5/141 713/323 |
| 2013/0016578 | A1* | 1/2013 | Wu | G11C 5/147 365/226 |
| 2013/0099568 | A1* | 4/2013 | Pan | G11C 5/04 307/31 |
| 2013/0124888 | A1* | 5/2013 | Tanaka | G06F 12/0246 713/320 |
| 2013/0124889 | A1* | 5/2013 | Natarajan | G06F 1/3278 713/320 |
| 2016/0062433 | A1* | 3/2016 | York | G06F 1/266 713/310 |
| 2019/0266084 | A1* | 8/2019 | Rose | G06F 12/0646 |
| 2020/0099248 | A1* | 3/2020 | Andrews | H02J 9/061 |
| 2021/0157697 | A1* | 5/2021 | Metcalf | G06F 13/36 |
| 2023/0011896 | A1* | 1/2023 | Serr | B64D 35/023 |
| 2023/0041215 | A1* | 2/2023 | Porzio | G06F 3/0625 |
| 2024/0097484 | A1* | 3/2024 | Sularea | H02J 3/32 |

* cited by examiner

Memory capacity
< 6 DIMMs
≥ 6 DIMMs
Power to memory in S0
12 V
12 V
Power to memory in S3
5 V Aux
12 V 200
PCIe 205
SATA 208
DIMMs 212
204
207
211
FET 203
FET 206
OR 210
209
12 V
202
5 V Aux
Power supply (ATX) 201

200a
PCIe 205
SATA 208
DIMMs 212
204
207
211
FET 203
FET 206
OR 210
209
12 V
202
5 V Aux
Power supply (ATX) 201

| Case | VR_GPIO | PM_SLP_S3_N | PS_ON | Power supply ON/OFF1 | Main rail switches ON/OFF2 | Select switch ON/OFF3 |
|---|---|---|---|---|---|---|
| 1 | 1 (>6 DIMM) | 0 (sleep) | 0 (ON) | 1 (ON) | 0 (OFF) | 1 (ON) |
| 2 | 1 | 1 (active) | 0 | 1 | 1 (ON) | 0 (OFF) |
| 3 | 0 | 0 | 0 | 0 (OFF) | 0 | 0 |
| 4 | 0 | 1 | 0 | 1 | 1 | 0 |

| Block | Byte Range (Decimal) | Byte Range (Hex) | Description |
|---|---|---|---|
| 0 | 0~63 | 0x000~0x03F | Base Configuration and DRAM Parameters |
| 1 | 64~127 | 0x040~0x07F | Base Configuration and DRAM Parameters |
| 2 | 128~191 | 0x080~0x0BF | Reserved for future use |
| 3 | 192~239 | 0x0C0~0x0EF | Common Module Parameters |
| | 240~255 | 0x0D0~0x0FF | Standard Module Parameters |
| 4 | 256~319 | 0x100~0x13F | Standard Module Parameters |
| 5 | 320~383 | 0x140~0x17F | Standard Module Parameters |
| 6 | 384~447 | 0x180~0x1BF | Standard Module Parameters |
| 7 | 448~509 | 0x1C0~0x1FD | Reserved for future use |
| | 510~511 | 0x1FE~0x1FF | CRC for SPD bytes 0~509 |
| 8 | 512~575 | 0x200~0x23F | Manufacturing information |
| 9 | 576~639 | 0x240~0x27F | Manufacturing information |
| 10 | 640~703 | 0x280~0x2BF | End User Programmable |
| 11 | 704~767 | 0x2C0~0x2FF | End User Programmable |
| 12 | 768~831 | 0x300~0x33F | End User Programmable |
| 13 | 832~895 | 0x340~0x37F | End User Programmable |
| 14 | 896~959 | 0x380~0x3BF | End User Programmable |
| 15 | 960~1023 | 0x3C0~0x3FF | End User Programmable |

Fig. 4

| Key Byte / Module Type<br>Bit 7 | Bits 6~4<br>Hybrid Media | Bits 3~0<br>Base Module Type |
|---|---|---|
| Hybrid | | 0000: Reserved<br>0001: RDIMM<br>0010: UDIMM<br>0011: SODIMM<br>0100: LRDIMM<br>0101: Reserved<br>0110: Reserved<br>0111: Reserved<br>1000: Reserved<br>1001: Reserved<br>1010: DDIMM<br>1011: Solder down<br>1100: Reserved<br>1101: Reserved<br>1110: Reserved<br>1111: Reserved |
| 0: Not hybrid<br>(Module is DRAM only)<br>1: Hybrid module<br>(See bits 6~4 for hybrid type) | Bits 6~4 | Bits 3~0 |

Fig. 5

MECHANISM TO OVERRIDE STANDBY POWER IN LARGE MEMORY CONFIGURATION OF WORKSTATIONS TO ELIMINATE THE NEED TO INCREASE POWER OF STANDBY POWER RAIL

FIELD

The present application generally relates to the field of computing devices and more particular to a controlling a power supply for a computing device.

BACKGROUND

A voltage supply is used in a computing system to supply power to the circuits of the system. A voltage supply can provide power at different voltages such as 3.3 V, 5 V and 12 V, for use by various components in the computing system. Moreover, a voltage supply can include an auxiliary or standby power supply for use when the computing system enters a sleep state. However, various challenges are presented in operating a voltage supply to minimize power consumption while providing adequate power.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 4 depicts an example of serial presence detection (SPD) data for use in the circuit 301 of FIG. 3A, according to various embodiments.

FIG. 5 depicts an example of memory type definitions for the DIMMs of FIG. 3C, according to various embodiments.

DETAILED DESCRIPTION

Figures 1, 2A, 2B:
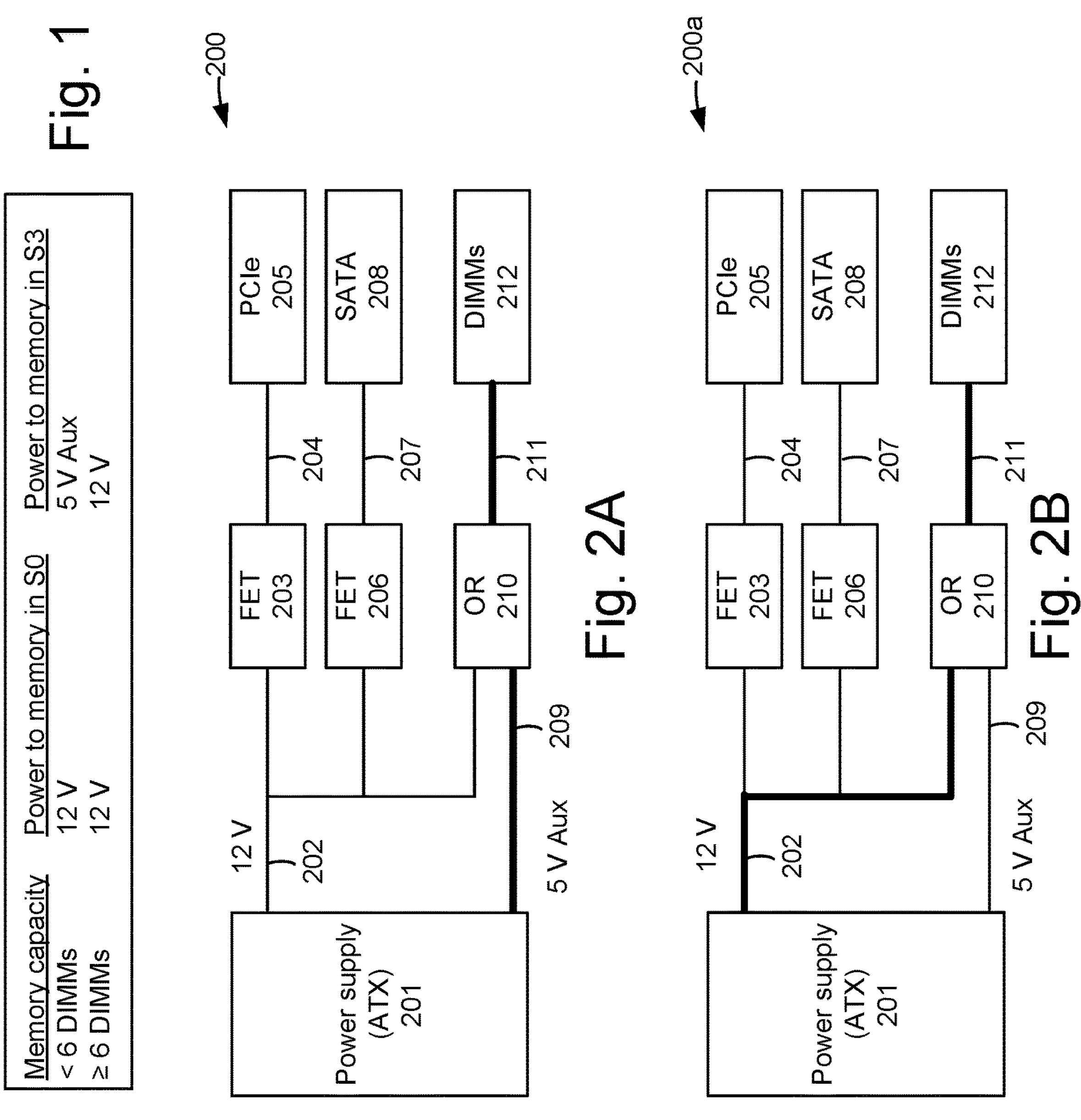
FIG. 1 depicts an example table of a power supply provided to memory devices such as dual inline memory modules (DIMMs) in a computing device, in an active mode (S0) and a sleep mode (S3), based on the number of memory devices installed, according to various embodiments.
FIG. 2A depicts an example block diagram of a circuit 200 in a configuration in which a power supply 201 provides an auxiliary power at 5 V Aux to a set of DIMMs 212, when a number of DIMMs is less than or equal to a threshold, according to various embodiments.
FIG. 2B depicts an example block diagram of the circuit 200 of FIG. 2A in a configuration in which the power supply 201 provides a main power at 12 V to the set of DIMMs 212, when the number of DIMMs is greater than a threshold, according to various embodiments.

As mentioned at the outset, various challenges are presented in operating a voltage supply of a computing system to minimize power consumption while providing adequate power.

One challenge involves accommodating a sleep state of the computing system. A computing system can transition from an active state (e.g., S0) to a sleep state (e.g., S3) when the system is not in use. In fact, the sleep state is required by regulatory agencies to reduce power consumption in computing devices such as personal computers (PCs) and workstations.

In S3, the power to the memory must continue to be powered such that the contents of the memory are retained. In the case of a workstation, for example, which has a relatively large memory configuration, a corresponding sizeable amount of power is required to retain the memory contents in S3. However, in S3, a typical off-the-shelf power supply unit (PSU) such as the Advanced Technology Extended (ATX) power supply may be insufficient to maintain the dynamic random access memory (DRAM) contents in self-refresh mode. In the sleep mode, the ATX typically provides a 5 V auxiliary power supply with a maximum current of 3 A, resulting in a maximum power of 15 W.

For example, a workstation with a memory configuration of 4 Terabytes (TB) can consume up to 29 W in S3. Moreover, memory density is expected to increase from the current 16 Gbit to 24 Gbit cells, for instance, and hence power requirements of the memory are unlikely to drop. To solve this issue, one possible solution is for the original equipment manufacturers (OEMs) to customize their ATX PSU to provide an optimum power output in S3. Other possible solutions include adding a supplementary wall adapter, or combining two power supplies in parallel to sum the two 5 V Aux power supplies to give a total of 15+15=30 W.

However, these solutions have a number of disadvantages such as higher cost, additional effort for certification and reduced efficiency with lighter loads. Moreover, increasing the power in the auxiliary rail during S3 makes it harder to meet regulatory requirements as power loss in other states such as DSx, S5 and S4 is also affected.

A solution provided herein addresses the above and other issues. Advantageously, the solution allows the re-use of the existing ATX PSU to support large memory configurations, hence saving the need to increase the size of the standby power. In one aspect, the solution includes a processor and associated basic input-output (BIOS) circuit which uses serial presence detect (SPD) data to determine a number of memory modules which are installed in slots on a motherboard or other printed circuit board (PCB). The data can also be used to obtain information regarding characteristics of the memory modules such as their type, number of ranks, capacity and maximum operating frequency. The memory modules may be dual in-line memory modules (DIMMs), for example.

The processor asserts a signal indicating whether the required power of the memory modules exceeds a threshold. This determination can be made based on whether the number of memory modules exceeds a threshold, for example. The signal is provided to a logic circuit along with a signal which indicates whether the processor is in an active state or a sleep state such as S3. The logic circuit outputs a signal to the power supply instructing it to keep its main rails turned on even when the processor is in a sleep state. The logic circuit also controls a set of switches using a main rail sequencer circuit to disconnect components which do not require power in the sleep state. The logic circuit further controls a switch which couples one of the main rails, e.g., the 12 V rail, to an auxiliary rail to power the memory modules using the usual active state power even though the sleep state has been asserted.

The processor can further provide a power on/off signal which can be overridden when the processor is in the sleep state and determines that the auxiliary power is not sufficient to meet the power requirements of the memory modules.

In an example implementation, the solution can detect the memory configuration of the system and decide if the configuration will consume power beyond the ATX PSU's standby capability. If it is going to exceed the power budget of 5 V Aux, the 12 V main rail will remain ON in low power state (S3). A mechanism is provided to detect the memory capacity along with logic circuitry on the motherboard to sustain the power required in standby, as well as addressing the power sequencing requirements of the Advanced Configuration and Power Interface (ACPI) standard.

Advantages include eliminating the need for OEMs to customize a new ATX PSU, reducing the system cost, eliminating the need for PSU regulatory testing, thus saving time and effort in certification, and maintaining the same or nearly same efficiency at light loads with a higher power capability for the memory in S3 or other sleep state.

The above and other advantages will be further apparent in view of the following discussion.

FIG. 1 depicts an example table of a power supply provided to memory devices such as dual inline memory modules (DIMMs) in a computing device, in an active mode (S0) and a sleep mode (S3), based on the number of memory devices installed, according to various embodiments. In this example, when a memory capacity is less than six DIMMs, the power supplied to the memory modules in S0 is from the 12 V main rail of the PSU, and the power supplied to the memory modules in S3 is from the 5 V auxiliary (Aux) rail of the PSU. However, when the memory capacity is greater than or equal to six DIMMs, the power supplied to the memory modules in both S0 and S3 is from the 12 V main rail of the PSU. The use of six DIMMs as a threshold is an example only. An appropriate threshold depends on the power requirements of the DIMMs and the available auxiliary power of the PSU.

Figures 7A, 7B:
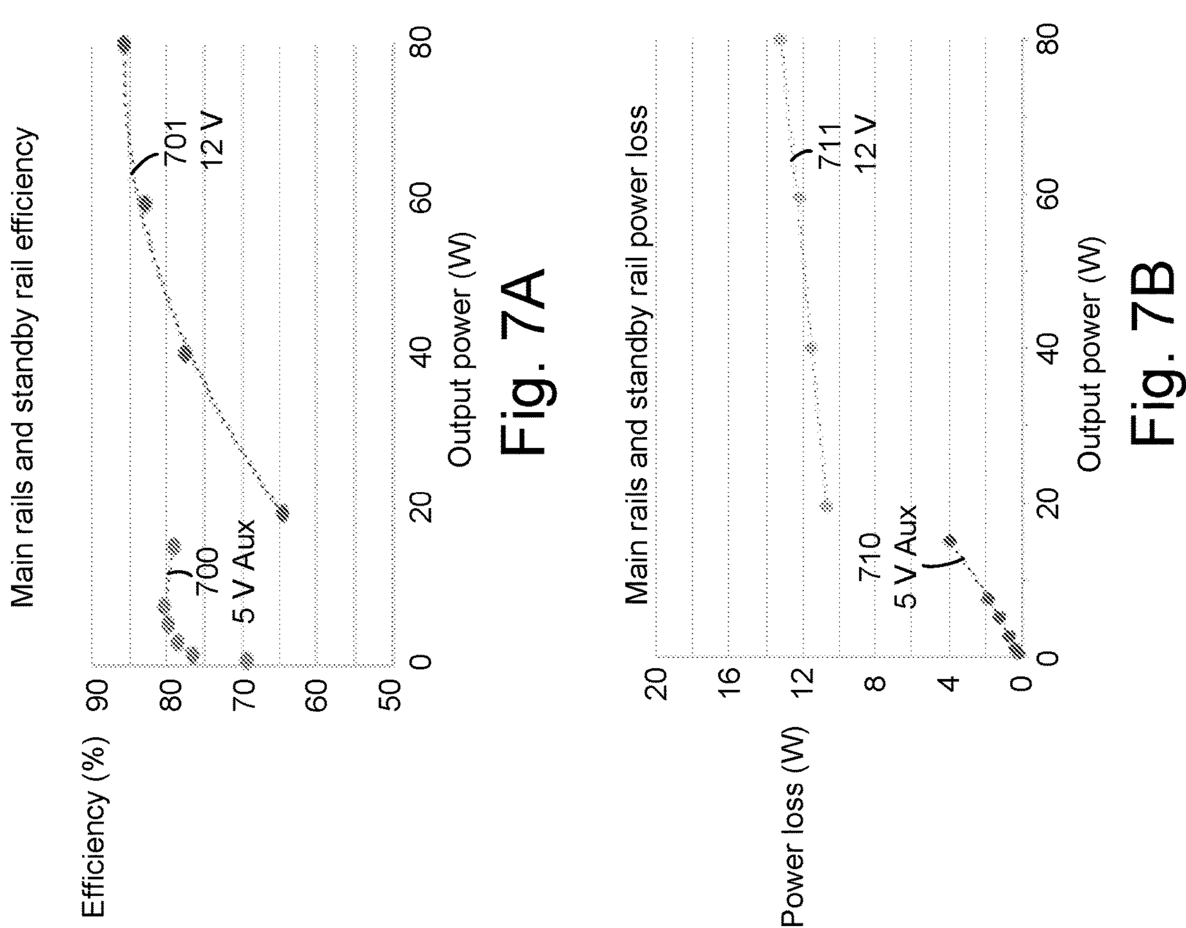
FIG. 7A depicts an example plot of efficiency vs. output power in the circuit 301 of FIG. 3A, according to various embodiments.
FIG. 7B depicts an example plot of power loss vs. output power in the circuit 301 of FIG. 3A, consistent with FIG. 7A, according to various embodiments.

With the 12 V main rail on in S3, there is sufficient power available for the DIMMs, although power efficiency is reduced, as discussed further in connection with FIGS. 7A and 7B. For example, data measurements of a 1600 W ATX power supply indicate the power loss difference between the 5 V Aux rail and the 12 V main rail when drawing 15 W of power is about 6.5 W. With a 15 W output load, the 5 V Aux power loss is 4.0 W, and the 12 V main rail power loss is 10.5 W. However, the power loss difference is smaller in other situations. In any case, the power loss is an acceptable tradeoff for the ability to use an existing PSU to meet the power requirements of the memory modules to avoid the loss of data in the sleep mode.

When the additional power loss of 6.5 W at 15 W output loading is analyzed from a regulatory perspective in S3, including Energy Star v8.0, California Energy Commission (CEC) Tier 2 and Japan's Top Runner, the total energy consumption (TEC) shows ample margin in a workstation configuration with 2 Terabytes memory.

FIG. 2A depicts an example block diagram of a circuit 200 in a configuration in which a power supply 201 provides an auxiliary power at 5 V Aux to a set of DIMMs 212, when a number of DIMMs is less than or equal to a threshold, according to various embodiments. The circuit 200 includes a power supply 201 such as an ATX power supply and a number of components which are to be powered. These include non-critical components such as a peripheral component interconnect express (PCIe) interface 205 and a Serial Advanced Technology Attachment (SATA) 208 and critical components such as DIMMs 212. PCIe is a standardized interface for motherboard components including graphics, memory, and storage. SATA is a command and transport protocol that defines how data is transferred between a computer's motherboard and mass storage devices, such as hard disk drives (HDDs), optical drives and solid-state drives (SSDs). The power supply provides 12 V on a main rail 202 and 5 V Aux on an auxiliary rail 209. A rail refers to a path or node, for example.

Critical components are those which are to be powered in the sleep state as well as the active state, while non-critical components are those which are to be powered in the active state but not the sleep state. Examples of critical components include the central processing unit (CPU) or other processor, random access memory (RAM), graphics processing unit (GPU) and the motherboard. Examples of non-critical components include a display, hard drive, fan, and ports.

Switches such as field-effect transistors (FETs) 203 and 206 can be turned on to provide the 12 V power to the PCIe and SATA, respectively, via paths 204 and 207, respectively, during the active state of the processor. An OR gate 210 can be controlled to provide the 12 V power or 5 V Aux power to the DIMMs via a path 211. In this configuration, the OR gate couples the 5 V Aux power to the DIMMs during the sleep (e.g., S3) state of the processor, as indicated by the thick lines.

FIG. 2B depicts an example block diagram of the circuit 200 of FIG. 2A in a configuration in which the power supply 201 provides a main power at 12 V to the set of DIMMs 212, when the number of DIMMs is greater than a threshold, according to various embodiments. In this configuration of the circuit, the OR gate is controlled to supply the 12 V power to the DIMMs during the sleep state instead of using the 5 V Aux power which is otherwise normally used in the S3 state, as indicated by the thick lines. The main rails of the power supply are kept turned on in the sleep state to provide the 12 V power on the main rail 202. The FETs 203 and 206 are turned off (made non-conductive) in the sleep state to remove any power from the PCIe and SATA.

Figure 3A:
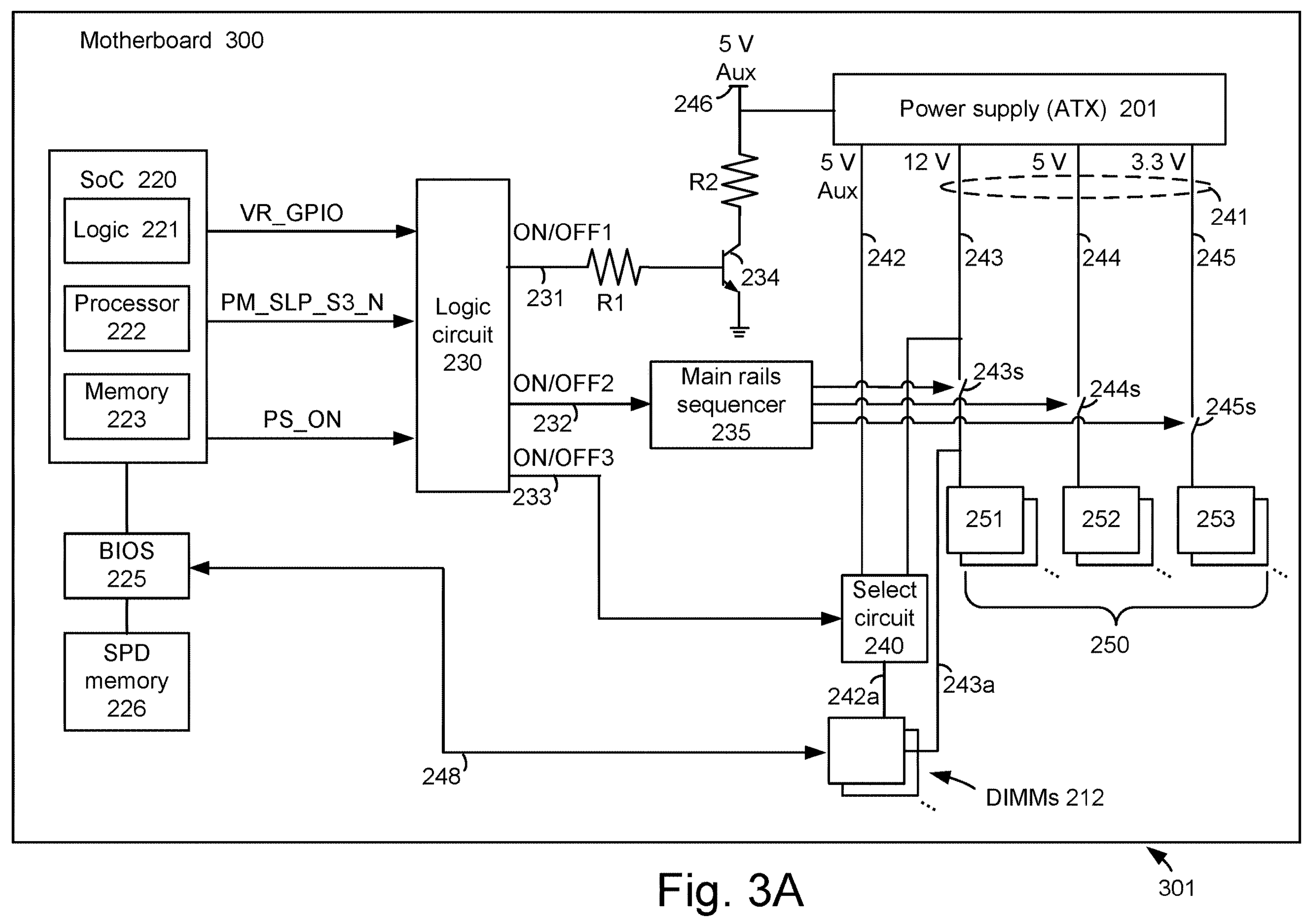
FIG. 3A depicts an example implementation of the circuit 200 of FIGS. 2A and 2B, according to various embodiments.

FIG. 3A depicts an example implementation of the circuit 200 of FIGS. 2A and 2B, according to various embodiments. A circuit 301 includes a motherboard 300 or other PCB on which a number of components are carried. A system on a chip (SoC) 220 includes logic 221, a processor 222 and a memory 223. The memory 223 stores software, firmware or other instructions which are to be executed by the processor 222 to provide the functions described herein. The logic 221 represents a decision-making process of the processor in deciding whether to set an override signal, VR_GPIO, on or off. In one approach, VR_GPIO=1 or high denotes override on and VR_GPIO=0 or low denotes override off. The processor also provides a signal, PM_SLP_S3_N, which indicates whether a sleep state is set. In one approach, PM_SLP_S3_N=0 denotes sleep state (e.g., S3) on, and PM_SLP_S3_N=1 denotes sleep state off, and active state set. The processor also provides a power state signal, PS_ON, which indicates whether the power supply is set on or off. In one approach, PS_ON=0 denotes power supply on, and PS_ON=1 denotes power supply off.

The processor is responsive to a BIOS 225 which may comprise a read-only memory (ROM) chip. The chip stores firmware used by the processor to start the computer system after it is powered on. The BIOS may communicate with the DIMMs via a path 248 to obtain SPD data to be stored in a SPD memory 226 such as an electrically erasable programmable read-only memory (EEPROM) chip. The SPD information is collected and stored on the chip when the computer system is booted. The SPD information can be used by the logic 221 in deciding whether to set VR_GPIO on or off.

The three signals output from the SoC are provided to a logic circuit 230. The logic circuit uses the input signals to set high or low values of first, second and third output signals, ON/OFF1, ON/OFF2 and ON/OFF3, respectively, on paths 231, 232 and 233, respectively. The path 231 is coupled to a resistor R1 and to the base of an n-p-n bipolar junction transistor (BJT) 234. An emitter of the BJT is coupled to ground while a collector of the BJT is coupled to a resistor R2 and a supply voltage node 246 at 5 V Aux, for example. ON/OFF1=1 indicates the power supply 201 is to be turned on and supply power on its set of main rails 241. The set of main rails 241 includes individual rails 243, 244 and 245 at 12 V, 5 V and 3.3 V, respectively, for example. ON/OFF1=0 indicates the power supply 201 is to be turned off and not supply power on its set of main rails 241. Power may be supplied in either case on an auxiliary power rail 242 from the supply voltage node 246, such as by using a current mirror. The power supply of the auxiliary rail 242 therefore may be separate from the power supply of the main rails.

ON/OFF2 is provided to a main rails sequencer circuit 235 which, in response to the signal, controls switches 243*s*, 244*s* and 245*s* coupled to the main rails 243, 244 and 245, respectively. The switches may be transistors, for example. When ON/OFF2=0, the switches are turned off (non-conductive), so that the main rails 243, 244 and 245 are decoupled from respective components 251, 252 and 253 (peripheral devices) in a set of non-critical components 250 and from the DIMMs 212 and potentially other critical components via a path 243*a*. When ON/OFF2=1, the switches are turned on (conductive), so that the main rails 243, 244 and 245 are coupled to the respective components 251, 252 and 253, respectively.

The switches 243*s*-245*s* are thus used to gate the main rails to the peripheral in the S3 state. These switches ensure that when the ATX main rails are forced to turn on, the peripherals connecting to the 3.3 V, 5 V and 12 V main rails will be disconnected from the respective power supplies. This is a requirement of the ACPI specification, i.e., in S3, the 12 V main rail is expected to be turned off.

Since the ATX main rails are intercepted by the switches 243*s*-245*s*, these external switches should turn off and on following the same sequence of an ATX power supply to ensure compliance with the ATX power sequencing specifications. Specifically, the removal of power from the peripheral devices should follow the order, 3.3 V→5 V→12 V, from lowest power/voltage to highest power/voltage. During exit from S3, a reverse mechanism takes place ensuring the main rails are restored to the peripheral devices in the reverse order, i.e., 12 V→5 V→3.3 V, from highest power/voltage to lowest power/voltage.

ON/OFF3 is provided to a select circuit 240 which, in response to the signal, couples either the 5 V Aux rail 242 or the 12 V rail 243 to the set of DIMMs 212 via a path 242*a* in the sleep state. In the active state, the 12 V rail 243 is coupled to the DIMMs via a path 243*a*. Note that the select circuit can provide the 12 V power to different types of critical components on the motherboard in the sleep state, in one approach. Note that the 12 V rail is the only main rail having a higher power than the 5 V Aux rail. If there were multiple main rails with a higher power than the 5 V Aux rail, the select circuit could select one of these main rails to power the DIMMs. For example, if there were 12 V and 15 V main rails, the select circuit could select one of these depending on the power requirement of the memory modules or other critical components. In this case, the logic circuit could be modified to provide a multibit select signal to the select circuit. The select circuit can comprise a multiplexer, for example.

When the BIOS determines that the override should occur, the power to the DIMMs (memory slots) may make a transition to power from 5 V Aux to the 12 V main rail. This should be done seamlessly to prevent voltage droop. A make-before-break circuit can be used to provide the seamless transitions in both directions, i.e., when switching from 5 V Aux to 12 V and from 5 V Aux to 12 V. A make-before-break circuit refers to a switch or other device in which a new electrical connection is made before the existing one is broken.

In sum, the BIOS can have a mechanism to intelligently detect memory configuration systems that can potentially draw standby power above the ATX standby limit when entering S3 low power mode. In the event the memory configuration is at risk of exceeding a threshold such as 15 W consumption, the logic circuit 230 acts as a power sequencing synchronization mechanism to provide an override of the ATX such that the main rails remain on prior to entering S3. Essentially, the ability of the sleep state to turn off the power supply can be overridden by VR_GPIO=1. To prevent the peripherals of the system such as PCIe, SATA, etc. from being powered in S3, the set of external switches 243*s*-245*s* (external to the power supply) are controlled by a main rails sequencer 235 to gate the main rails to these peripherals. The select circuit 240 acts as an OR circuit to select the 12 V main rail of or the 5 V auxiliary rail to power the DIMMs. As a result, in S3, the main power rails to all the peripherals can be turned off while the standby rail is supplied by the 12 V main rail via the select circuit.

Figure 3B:
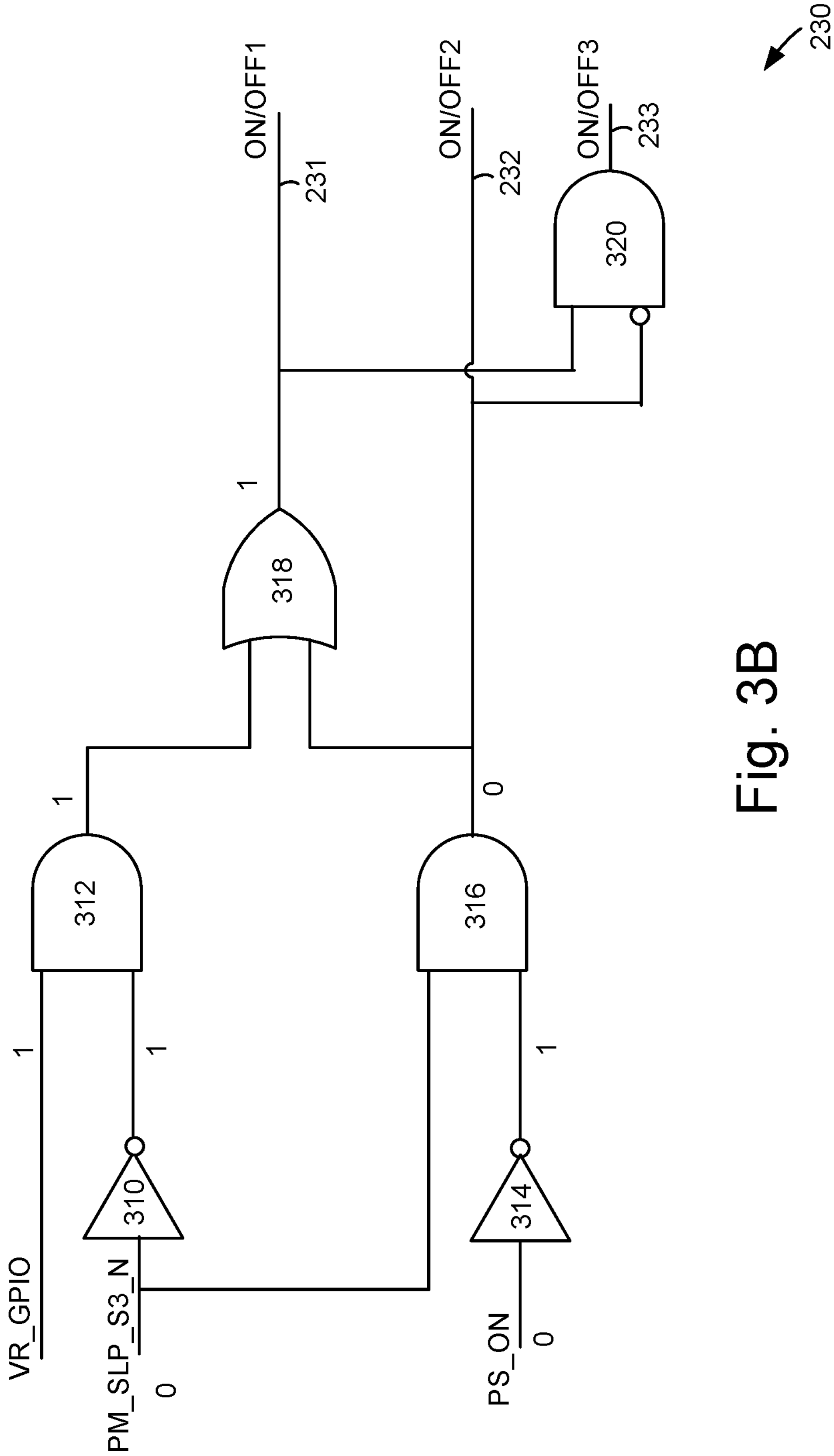
FIG. 3B depicts an example implementation of the logic circuit 230 of FIG. 3A, according to various embodiments.

FIG. 3B depicts an example implementation of the logic circuit 230 of FIG. 3A, according to various embodiments. The logic circuit receives the signals VR_GPIO, PM_SLP_S3_N and PS_ON, and in response, outputs the signals ON/OFF1, ON/OFF2 and ON/OFF3 on paths 231, 232 and 233, respectively. PM_SLP_S3_Nis provided to an inverter 310, and an output of the inverter is provided as one input of an AND gate 312. VR_GPIO is another input of the AND gate 312. An output of the AND gate 312 is provided as one input of an OR gate 318.

PM_SLP_S3_N is also provided as one input of an AND gate 316. PS_ON is provided to an inverter 314, and an output of the inverter is provided as another input of the AND gate 316. The output of the AND gate 316 is provided as another input of the OR gate 318. ON/OFF1 is an output of the OR gate 318. ON/OFF2 is an output of the AND gate 316. An AND gate 320 receives ON/OFF1 as one input and an inverse of ON/OFF2 as another input. ON/OFF3 is an output of the AND gate 320.

Bit values (0 and 1) are depicted at various locations in the logic circuit for an example case in which the override signal is on (VR_GPIO=1), the sleep state is set (PM_SLP_S3_N=0) and the power supply is set on (PS_ON=0). This is case 1 in FIG. 3C. In this case, the output of the inverter 310 is 1 so that the output of the AND gate 312 is 1. As a result, the output of the OR gate, ON/OFF1, will be 1 regardless of PS_ON. Here, the output of the inverter 314 is 1 and the output of the AND gate 316 is 0. If PS_ON=1, the output of the AND gate 316 is still 0 as long as PM_SLP_S3_N=0.

The logic circuit depicted is one possible implementation, as other implementations are possible. The logic circuit can be separate from, or included within, the processor 222 or other component, for example.

As mentioned, the logic circuit can override the ability of the PS_ON signal to turn off the power supply in the sleep state by setting VR_GPIO=1. The logic circuit receives an input (VR_GPIO) from the processor or other PCH, and the sleep signal PM_SLP_S3_N, to set an override signal, ON/OFF1, in some cases. If S3, PM_SLP_S3_N is low and with the inverter 310 to the AND gate 312, the output of the AND gate 312 will be determined by VR_GPIO. If the intelligence of the logic 221 determines that the power budget is insufficient, VR_GPIO will be asserted high. Since the next logic gate 318 is an OR gate, regardless of the other input from the AND gate 316, a high override signal ON/OFF1 will be asserted to keep the ATX main rails turned on.

If PM_SLP_S3_N is high, the system will enter the active state, S0 and the added power sequence logic design becomes irrelevant as its AND gate 312 will always be low, gating any influence from VR_GPIO.

Figures 3C, 3D:
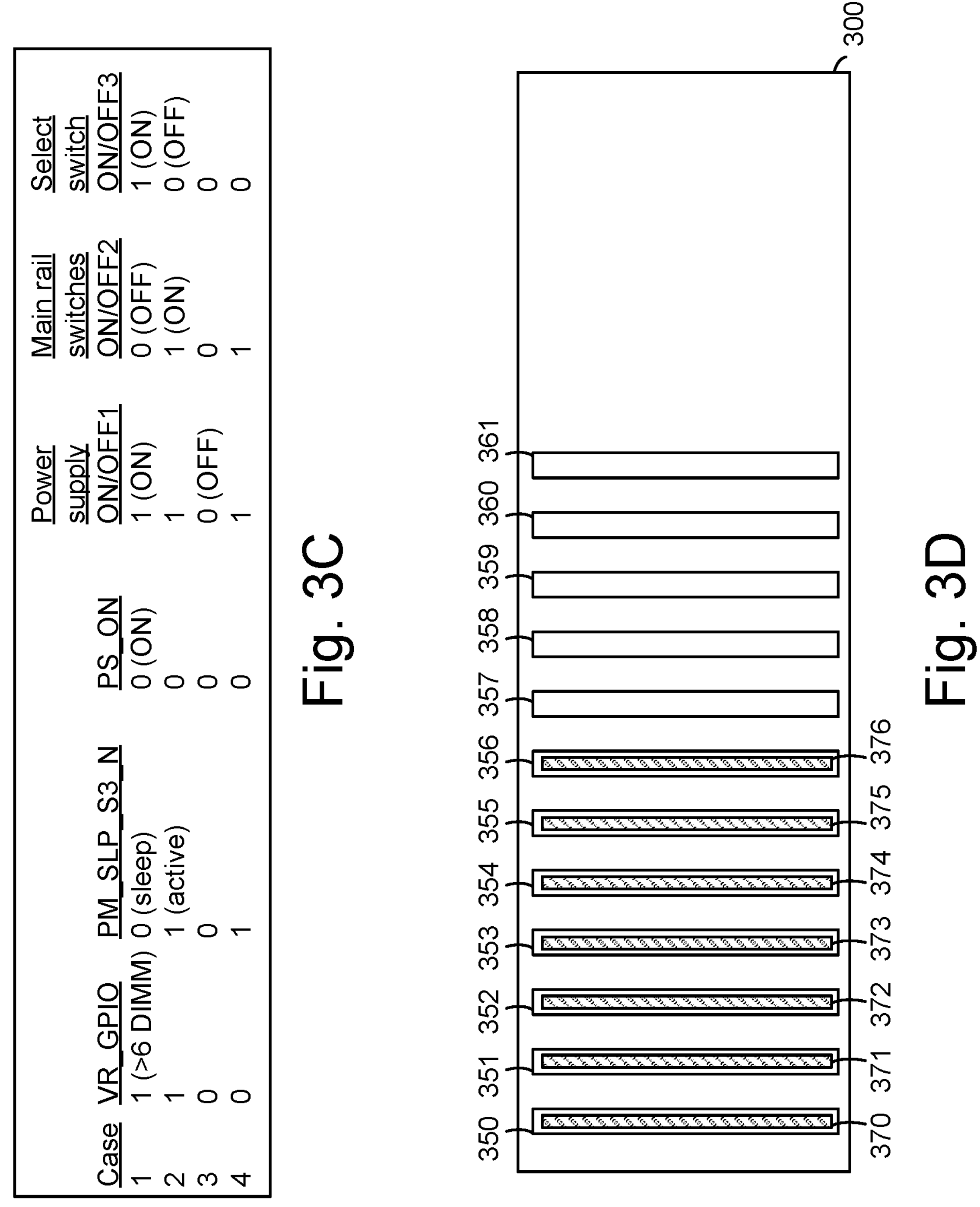
FIG. 3C depicts an example table of signals in FIG. 3A for different cases, according to various embodiments.
FIG. 3D depicts an example implementation of the DIMMs 212 of FIG. 3A, according to various embodiments.

FIG. 3C depicts an example table of signals in FIG. 3A for different cases, according to various embodiments. Cases 1-4 represent PS_ON=0 (power supply on). Case 1 was discussed in connection with FIG. 3B. As mentioned, when VR_GPIO=1 (override on) and PM_SLP_S3_N=0 (sleep state), the power supply remains on (ON/OFF1=1), the main rail switches are off (ON/OFF2=0), indicating the non-critical components are not powered, and the select switch is on (ON/OFF3=1), indicating it connects the 12 V main rail to the memory modules and other critical components.

In case 2, when VR_GPIO=1 (override on) and PM_SLP_S3_N=1 (active state), the power supply remains on (ON/OFF1=1), the main rail switches are on (ON/OFF2=1), indicating the critical and non-critical components are powered by the main rails, and the select switch is off (ON/OFF3=0), indicating it does not connect the 12 V main rail to the auxiliary rail.

In case 3, when VR_GPIO=0 (override off) and PM_SLP_S3_N=0 (sleep state), the power supply is off (ON/OFF1=0), the main rail switches are off (ON/OFF2=1), indicating the non-critical components are not powered, and the select switch is off (ON/OFF3=0), indicating it does not connect the 12 V main rail to the auxiliary rail.

In case 4, when VR_GPIO=0 (override off) and PM_SLP_S3_N=1 (active state), the power supply is on (ON/OFF1=1), the main rail switches are on (ON/OFF2=1), indicating the critical and non-critical components are powered by the main rails, and the select switch is off (ON/OFF3=0), indicating it does not connect the 12 V main rail to the auxiliary rail.

If PS_ON=1 (power supply off), the power supply would turn off as this represents the case of turning of the computing device.

FIG. 3D depicts an example implementation of the DIMMs 212 of FIG. 3A, according to various embodiments. In this example, the motherboard includes 12 slots 350-361 for memory modules such as DIMMs. Seven of the slots, e.g., slots 350-356 have modules 370-376, respectively, installed therein. As mentioned, SPD data can be used to detect the number of DIMMs installed in the slots.

FIG. 4 depicts an example of serial presence detection (SPD) data for use in the circuit 301 of FIG. 3A, according to various embodiments. The detection of the memory configuration in a computing device can be performed by the BIOS and a processor/controller with a general purpose input/output (GPIO), such as a platform controller hub (PCH) GPIO. As mentioned, the BIOS can detect the memory type using serial presence detect (SPD) data for memory modules such as Double Data Rate 5 Synchronous Dynamic Random-Access Memory (DDR5 SDRAM).

SPD indicates the type of DIMM, the number of ranks, and density information about the present memory on the platform. Example types of DIMMs include registered (RDIMM), unbuffered (UDIMM), small outline (SODIMM), load-reduced (LRDIMM) or differential (DDIMM).

As an example, DDR5 SDRAM supports the JEDEC standard SPD5118 for SPD data. This type of memory device has sixteen individuals write protection blocks of 64 bytes in length each. The SPD contents are depicted in FIG. 4. The first column denotes a block number, the second column denotes a decimal byte range, the third column denotes a hexadecimal byte range and the fourth column provides a description. CRC refers to check bits of a cyclic redundancy check error-detecting code.

The BIOS would read first 0-63 bytes to interpret DDR5 DIMM type, maximum operating frequency, the number of row, column, bank bits, write recovery time, etc. SPD byte 3, bits 3~0 identifies the SDRAM memory module type, and bits 7~4 describe hybrid memory extensions as shown in FIG. 5.

FIG. 5 depicts an example of memory type definitions for the DIMMs of FIG. 3C, according to various embodiments. The first column depicts a key byte or module type, the second column depicts bits 6~4 and the third column depicts bits 3~0.

SPR byte 4 would indicate DIMM density. The BIOS can read the SPD content over an I3C bus on the workstation or other computing device platform. MIPI I3C (also known as Sense Wire) is a specification to enable communication between computer chips by defining the electrical connection between the chips and signaling patterns to be used. I3C refers to Improved Inter Integrated Circuit. It is a specification of the Mobile Industry Processor Interface (MIPI) Alliance.

Once the BIOS reads the DIMM type and number of installed DIMMs over SPD, the BIOS can check the platform memory process of record (POR) to determine if the memory population is set according to the POR configuration. If the memory population is set according to the POR configuration, the BIOS memory initialization proceeds further. In case the memory population is not set according to the platform POR, the BIOS will halt and set an invalid memory BIOS configuration error. The BIOS contains a memory POR configuration table internally with memory population rules of that platform which has supported memory population, POR memory frequency, etc. on that platform.

Once BIOS detects there are more than 6 DIMMs (as an example) on the platform, the BIOS can assert VR_GPIO on the workstation BIOSes. VR_GPIO is routed to the ATX power supply via a PS_ON override logic circuitry such as depicted in the logic circuit 230 of FIG. 3B. An example BIOS boot flow is shown in below in connection with FIG. 6.

Figure 6:
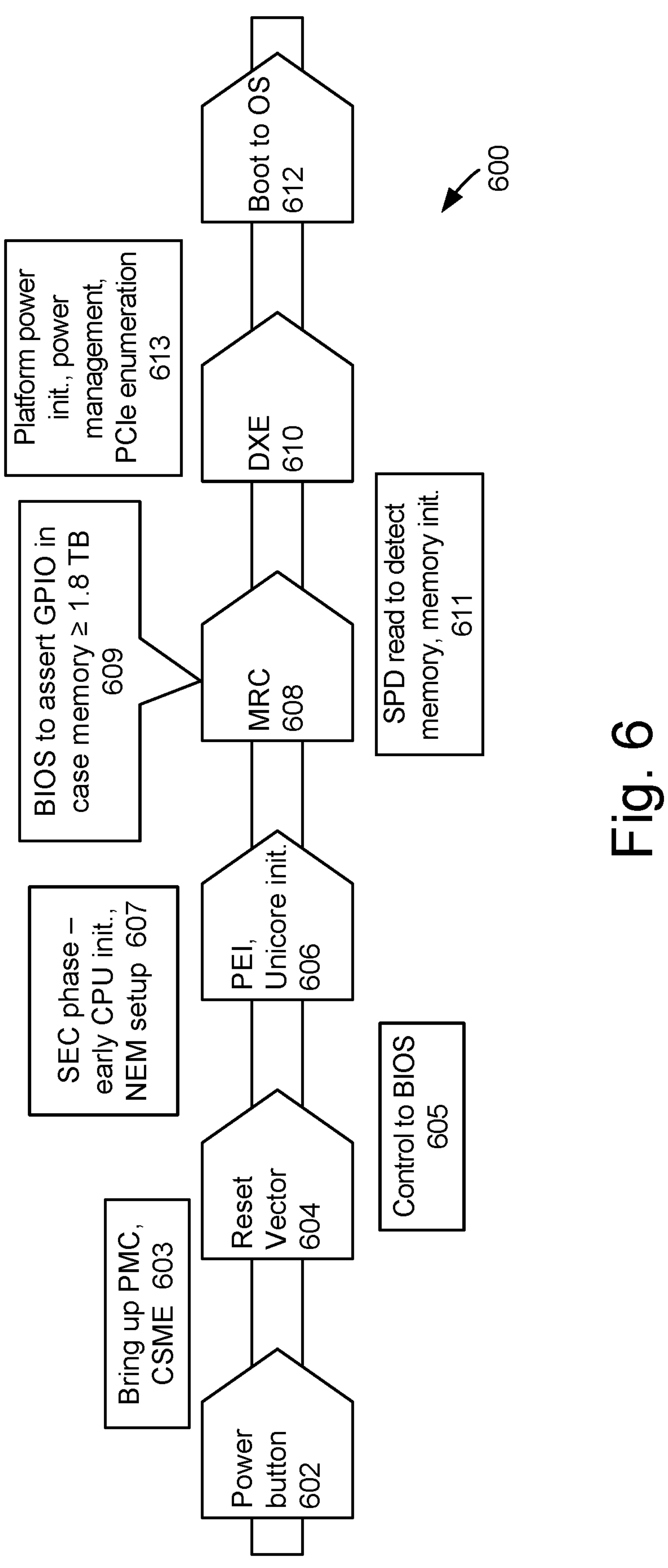
FIG. 6 depicts an example startup process which asserts VR_GPIO in the circuit 301 of FIG. 3A, according to various embodiments.

FIG. 6 depicts an example startup process which asserts VR_GPIO in the circuit 301 of FIG. 3A, according to various embodiments. The process 600 begins with the power button being pressed by the user at step 602. Step 603 depicts bringing up the Performance Management Client (PMC) (a bundle which includes all the PC based Windows components) and Converged Security and Management Engine (CSME) (a hardware based manageability and security controller isolated from the CPU).

Step 604 depicts a using a reset vector, which is a pointer or address at which the processor begins its execution. Step 605 depicts a control to BIOS communication. Step 607 depicts a security (SEC) phase including early CPU initialization and Network Express Module (NEM) setup. Step 606 depicts Pre-EFI Initialization (PEI) and Unicore initialization, where EFI denotes an Extensible Firmware Interface. Step 608 depicts using the memory reference code (MRC), which is the part of the motherboard's firmware that determines how the computer's memory (RAM) will be initialized, and adjusts memory timing algorithms correctly for the effects of any modifications set by the user or computer hardware.

Step 609 indicates the BIOS is to assert a GPIO in case the memory ≥1.8 TB. Step 611 indicates the SPD is read to detect the memory modules, and memory initialization is performed. Step 610 depicts the Driver Execution Environment (DXE) phase, which loads drivers that initialize the rest of the system hardware. Step 613 depicts platform power initialization, power management and PCIe enumeration. Step 612 depicts boot to operating system (OS).

FIG. 7A depicts an example plot of efficiency vs. output power in the circuit 301 of FIG. 3A, according to various embodiments. A plot 700 depicts data for a 5 V Aux rail and a plot 701 depicts data for a 12 V main rail. With the 12 V main rail, the efficiency increases as the output power increases, e.g., in a range of about 20-80 W. With the 5 V Aux rail, the power increases to a peak and then starts to decrease, e.g., in a range of about 0-18 W. These plots show that the efficiency at higher output powers with the 5 V Aux rail begin to converge with the efficiency at lower output powers with the 12 V rail.

FIG. 7B depicts an example plot of power loss vs. output power in the circuit 301 of FIG. 3A, consistent with FIG. 7A, according to various embodiments. A plot 710 depicts data for a 5 V Aux rail and a plot 711 depicts data for a 12 V main rail. With the 12 V main rail, the power loss increases gradually as the output power increases. With the 5 V Aux rail, the power increases at a greater rate than for the 12 V main rail.

Figure 8:
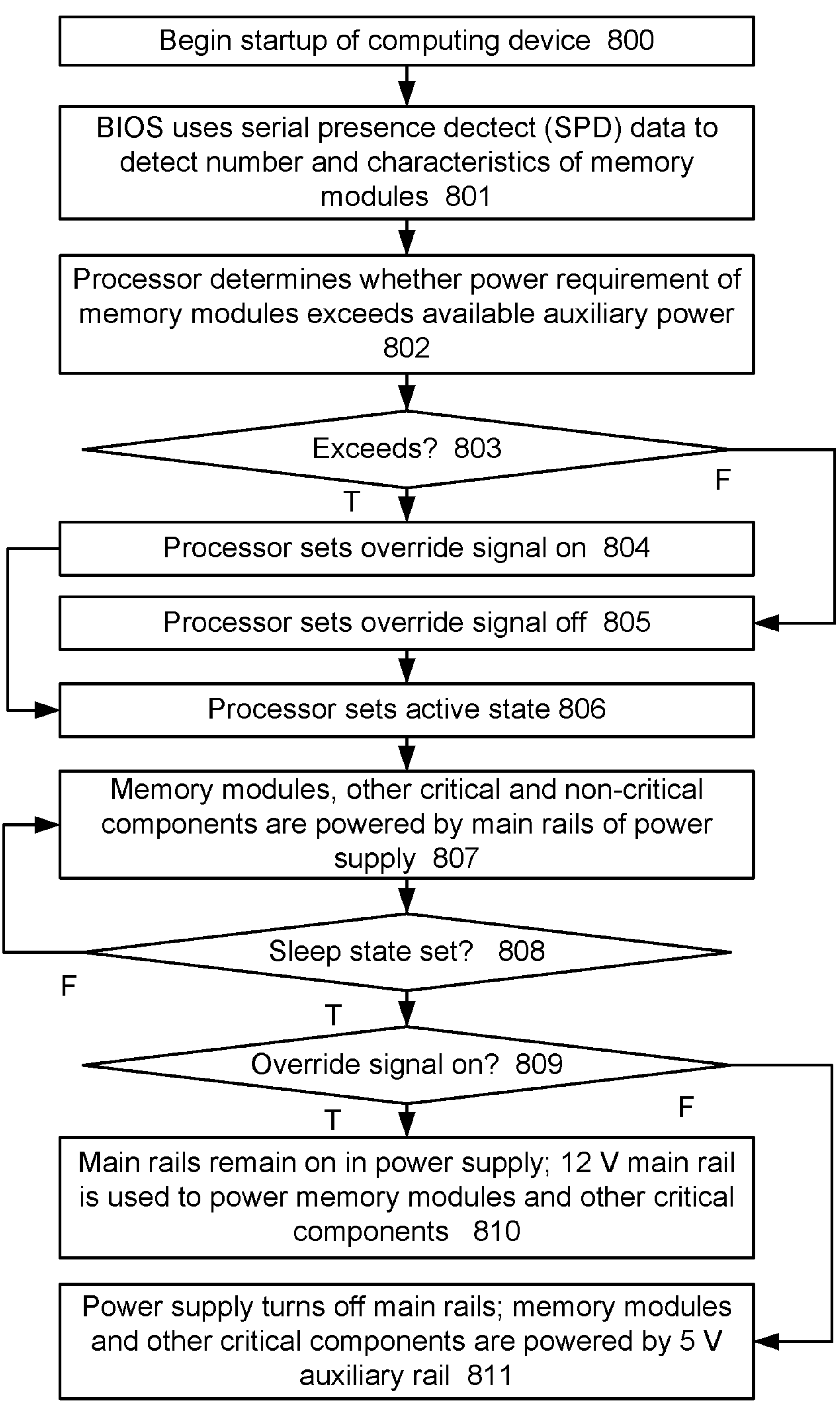
FIG. 8 depicts a flowchart of an example process consistent with the circuit 301 of FIG. 3A, according to various embodiments.

FIG. 8 depicts a flowchart of an example process consistent with the circuit 301 of FIG. 3A, according to various embodiments. The processor can be performed by the professor, logic circuit and/or other components in FIG. 3A, for example. Step 800 begins the startup of a computing device, such as when the device is powered on. At step 801, the BIOS uses the serial presence detect (SPD) data to detect the number and characteristics of the memory modules. For example, the memory modules can be DIMMs. As mentioned, the characteristics can include, e.g., type, number of ranks, capacity and maximum operating frequency. This information is stored in the SPD memory 226 for access by the processor. At step 802, the processor determines whether the power requirement of the memory modules exceeds the available auxiliary power. This can involve, e.g., determining whether the number of memory modules exceeds a threshold and/or summing the power requirements of the memory modules based on their characteristics and determining whether the sum exceeds a threshold.

In one approach, the processor can store information indicating the power requirements associated with the specific characteristics. For example, the processor may determine that there are six memory modules of type 1 with a power requirement of 3 W each. The sum of the power requirements is therefore 18 W. If the available auxiliary power is 15 W, the power requirement of the memory modules exceeds the available auxiliary power. In one approach, the processor determines whether the power requirement of the memory modules plus a margin exceeds the available auxiliary power. This ensures that the power requirement is not too close to the available auxiliary power. In one option, in step 802, the processor determines whether the power requirement of the memory modules summed with the power requirement of other critical components exceeds the available auxiliary power.

At a decision step 803, the processor determines whether the power requirement of the memory modules exceeds the available auxiliary power. If the decision step is true, the processor sets an override signal on, e.g., VR_GPIO=1, at step 804. If the decision step is false, the processor sets the override signal off, e.g., VR_GPIO=0, at step 805.

At step 806, the processor sets the active state, e.g., PM_SLP_S3_M=1. At step 807, the memory modules and other critical and non-critical components are powered by the main rails of a power supply. For example, the main rails may supply power at 3.3 V, 5 V and 12 V.

A decision step 808 determines whether the processor sets the sleep state, e.g., decides to transition from the active state to the sleep state. If the decision step 808 is false, step 807 is reached and the memory modules and other critical and non-critical components continue to be powered by the main rails of a power supply. If the decision step 808 is true, a decision step 809 determines whether the override signal is on. If the decision step 809 is false, the power supply turns off the main rails, and the memory modules and other critical components are transitioned to being powered by the 5 V auxiliary rail or other auxiliary power source at step 811. If the decision step 809 is true, the main rails remain on in the power supply, and the 12 V main rail is used to power the memory modules and other critical components at step 810.

The memory modules and other critical and non-critical components can transition back to being powered by the main rails when the processor transitions back to the active state.

Figure 9:
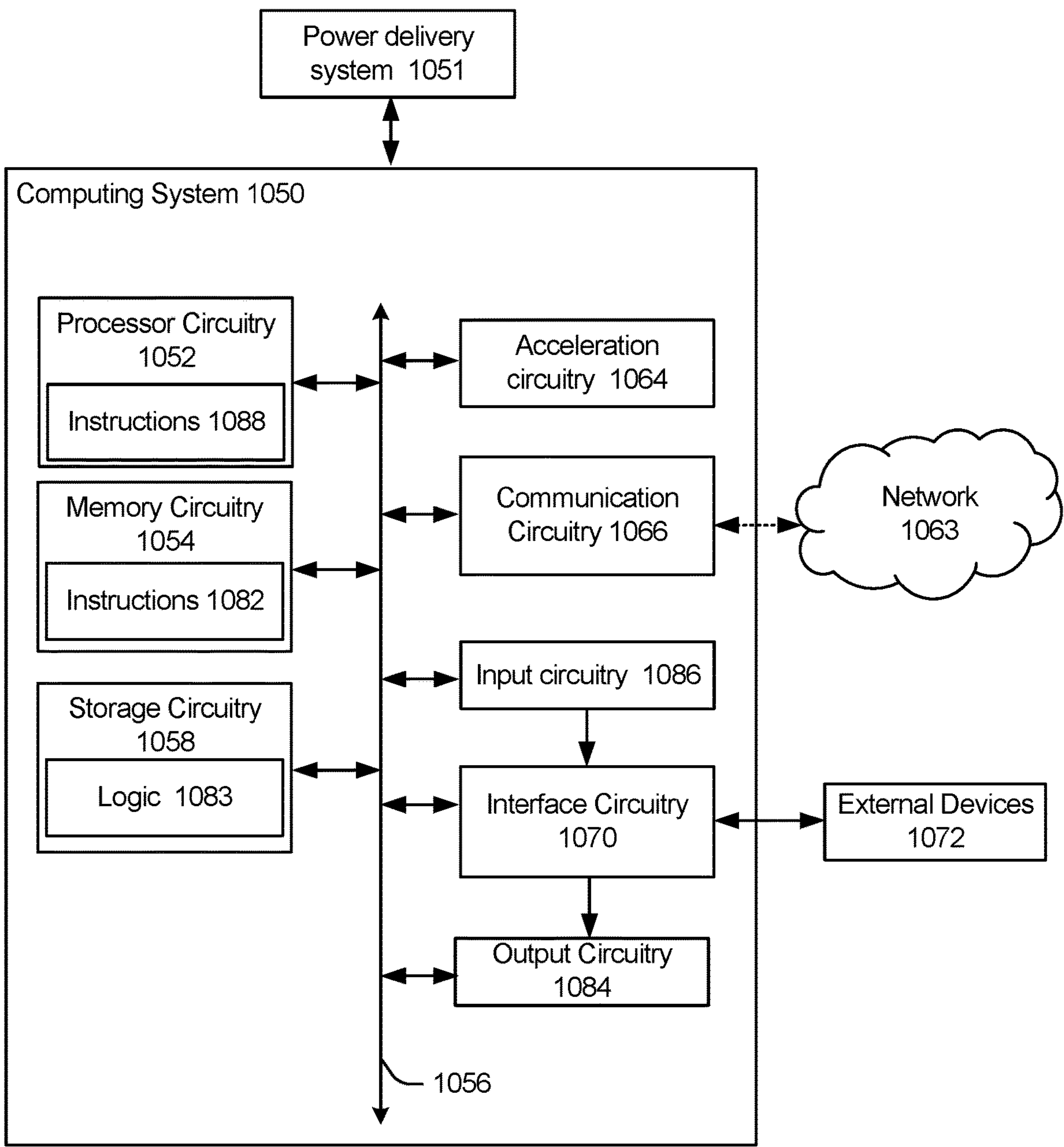
FIG. 9 illustrates an example of components that may be present in a computing system 1050 for implementing the techniques (e.g., operations, processes, methods, and methodologies) described herein.

FIG. 9 illustrates an example of components that may be present in a computing system 1050 for implementing the techniques (e.g., operations, processes, methods, and methodologies) described herein. The circuit of FIG. 3A can be located in a power delivery system 1051 which provides power to one or more other components of the computing system.

The computing system 1050 may include any combinations of the hardware or logical components referenced herein. The components may be implemented as ICs, portions thereof, discrete electronic devices, or other modules, instruction sets, programmable logic or algorithms, hardware, hardware accelerators, software, firmware, or a combination thereof adapted in the computing system 1050, or as components otherwise incorporated within a chassis of a larger system. For one embodiment, at least one processor 1052 may be packaged together with computational logic 1082 and configured to practice aspects of various example embodiments described herein to form a System in Package (SiP) or a System on Chip (SoC).

The system 1050 includes processor circuitry in the form of one or more processors 1052. The processor circuitry 1052 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1052 may include one or more hardware accelerators (e.g., same or similar to acceleration circuitry 1064), which may be microprocessors, programmable processing devices (e.g., FPGA, ASIC, etc.), or the like. The one or more accelerators may include, for example, computer vision and/or deep learning accelerators. In some implementations, the processor circuitry 1052 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1052 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1052 may be coupled with or may include memory/storage and may be configured to execute instructions stored in the memory/storage to enable various applications or operating systems to run on the platform 1050. The processors (or cores) 1052 is configured to operate application software to provide a specific service to a user of the platform 1050. In some embodiments, the processor(s) 1052 may be a special-purpose processor(s)/controller(s) configured (or configurable) to operate according to the various embodiments herein.

As examples, the processor(s) 1052 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MXGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1052 may be a part of a system on a chip (SoC), System-in-Package (SiP), a multi-chip package (MCP), and/or the like, in which the processor(s) 1052 and other components are formed into a single integrated circuit, or a single package, such as the Edison™ or Galileo™ SoC boards from Intel® Corporation. Other examples of the processor(s) 1052 are mentioned elsewhere in the present disclosure.

The system 1050 may include or be coupled to acceleration circuitry 1064, which may be embodied by one or more AI/ML accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 1064 may comprise logic blocks or logic fabric and other interconnected resources that may be programmed (configured) to perform various functions, such as the procedures, methods, functions, etc. of the various embodiments discussed herein. In such implementations, the acceleration circuitry 1064 may also include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 1052 and/or acceleration circuitry 1064 may include hardware elements specifically tailored for machine learning and/or artificial intelligence (AI) functionality. In these implementations, the processor circuitry 1052 and/or acceleration circuitry 1064 may be, or may include, an AI engine chip that can run many different kinds of AI instruction sets once loaded with the appropriate weightings and training code. Additionally or alternatively, the processor circuitry 1052 and/or acceleration circuitry 1064 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPS™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 1052 and/or acceleration circuitry 1064 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some hardware-based implementations, individual subsystems of system 1050 may be operated by the respective AI accelerating co-processor(s), AI GPUs, TPUs, or hardware accelerators (e.g., FPGAS, ASICs, DSPs, SoCs, etc.), etc., that are configured with appropriate logic blocks, bit stream(s), etc. to perform their respective functions.

The system 1050 also includes system memory 1054. Any number of memory devices may be used to provide for a given amount of system memory. As examples, the memory 1054 may be, or include, volatile memory such as random access memory (RAM), static RAM (SRAM), dynamic RAM (DRAM), synchronous DRAM (SDRAM), RAMBUS® Dynamic Random Access Memory (RDRAM®), and/or any other desired type of volatile memory device. Additionally or alternatively, the memory 1054 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 1054 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 1058 provides persistent storage of information such as data, applications, operating systems and so forth. In an example, the storage 1058 may be implemented via a solid-state disk drive (SSDD) and/or high-speed electrically erasable memory (commonly referred to as "flash memory"). Other devices that may be used for the storage 1058 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 1054 and/or storage circuitry 1058 may also incorporate three-dimensional (3D) cross-point (XPOINT) memories from Intel® and Micron®.

The memory circuitry 1054 and/or storage circuitry 1058 is/are configured to store computational logic 1083 in the form of software, firmware, microcode, or hardware-level instructions to implement the techniques described herein. The computational logic 1083 may be employed to store working copies and/or permanent copies of programming instructions, or data to create the programming instructions, for the operation of various components of system 1050 (e.g., drivers, libraries, application programming interfaces (APIs), etc.), an operating system of system 1050, one or more applications, and/or for carrying out the embodiments discussed herein. The computational logic 1083 may be stored or loaded into memory circuitry 1054 as instructions 1082, or data to create the instructions 1082, which are then accessed for execution by the processor circuitry 1052 to carry out the functions described herein. The processor circuitry 1052 and/or the acceleration circuitry 1064 accesses the memory circuitry 1054 and/or the storage circuitry 1058 over the interconnect (IX) 1056. The instructions 1082 direct the processor circuitry 1052 to perform a specific sequence or flow of actions, for example, as described with respect to flowchart(s) and block diagram(s) of operations and functionality depicted previously. The various elements may be implemented by assembler instructions supported by processor circuitry 1052 or high-level languages that may be compiled into instructions 1088, or data to create the instructions 1088, to be executed by the processor circuitry 1052. The permanent copy of the programming instructions may be placed into persistent storage devices of storage circuitry 1058 in the factory or in the field through, for example, a distribution medium (not shown), through a communication interface (e.g., from a distribution server (not shown)), over-the-air (OTA), or any combination thereof.

The IX 1056 couples the processor 1052 to communication circuitry 1066 for communications with other devices, such as a remote server (not shown) and the like. The communication circuitry 1066 is a hardware element, or collection of hardware elements, used to communicate over one or more networks 1063 and/or with other devices. In one example, communication circuitry 1066 is, or includes, transceiver circuitry configured to enable wireless communications using any number of frequencies and protocols such as, for example, the Institute of Electrical and Electronics Engineers (IEEE) 802.11 (and/or variants thereof), IEEE 802.23.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 1066 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others.

The IX 1056 also couples the processor 1052 to interface circuitry 1070 that is used to connect system 1050 with one or more external devices 1072. The external devices 1072 may include, for example, sensors, actuators, positioning circuitry (e.g., global navigation satellite system (GNSS)/Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the system 1050, which are referred to as input circuitry 1086 and output circuitry 1084. The input circuitry 1086 and output circuitry 1084 include one or more user interfaces designed to enable user interaction with the platform 1050 and/or peripheral component interfaces designed to enable peripheral component interaction with the platform 1050. Input circuitry 1086 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1084 may be included to show information or otherwise convey information, such as sensor readings, actuator position(s), or other like information. Data and/or graphics may be displayed on one or more user interface components of the output circuitry 1084. Output circuitry 1084 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1050. The output circuitry 1084 may also include speakers and/or other audio emitting devices, printer(s), and/or the like. Additionally or alternatively, sensor(s) may be used as the input circuitry 1084 (e.g., an image capture device, motion capture device, or the like) and one or more actuators may be used as the output device circuitry 1084 (e.g., an actuator to provide haptic feedback or the like). Peripheral component interfaces may include, but are not limited to, a non-volatile memory port, a USB port, an audio jack, a power supply interface, etc. In some embodiments, a display or console hardware, in the context of the present system, may be used to provide output and receive input of an edge computing system; to manage components or services of an edge computing system; identify a state of an edge computing component or service; or to conduct any other number of management or administration functions or service use cases.

The components of the system 1050 may communicate over the IX 1056. The IX 1056 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 1056 may be a proprietary bus, for example, used in a SoC based system.

The number, capability, and/or capacity of the elements of system 1050 may vary, depending on whether computing system 1050 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 1050 may comprise one or more components of a data center, a desktop computer, a workstation, a laptop, a smartphone, a tablet, a digital camera, a smart appliance, a smart home hub, a network appliance, and/or any other device/system that processes data.

The techniques described herein can be performed partially or wholly by software or other instructions provided in a machine-readable storage medium (e.g., memory). The software is stored as processor-executable instructions (e.g., instructions to implement any other processes discussed herein). Instructions associated with the flowchart (and/or various embodiments) and executed to implement embodiments of the disclosed subject matter may be implemented as part of an operating system or a specific application, component, program, object, module, routine, or other sequence of instructions or organization of sequences of instructions.

The storage medium can be a tangible machine readable medium such as read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs)), among others.

The storage medium may be included, e.g., in a communication device, a computing device, a network device, a personal digital assistant, a manufacturing tool, a mobile communication device, a cellular phone, a notebook computer, a tablet, a game console, a set top box, an embedded system, a TV (television), or a personal desktop computer.

Some non-limiting examples of various embodiments are presented below.

Example 1 includes an apparatus, comprising: a processor on a printed circuit board (PCB), wherein the PCB comprises slots for memory modules, and the processor is to detect a number of the slots having memory modules installed, provide a signal which indicates whether the number of slots exceeds a threshold, and provide a signal which indicates whether a sleep state or active state of the processor is asserted; and a logic circuit coupled to the processor, wherein the logic circuit is responsive to the signals, and when the number of slots exceeds the threshold and the sleep state is asserted, the logic circuit is to instruct a power supply for the PCB to turn on a main power rail of the power supply and instruct a switch to couple the main power rail to the memory modules.

Example 2 includes the apparatus of Example 1, when the number of slots does not exceed the threshold and the sleep state is asserted, the logic circuit is to turn off the main power rail, and to instruct the switch to couple an auxiliary power rail of the power supply to the memory modules.

Example 3 includes the apparatus of Example 1 or 2, wherein the processor is to use serial presence detect data to detect the number of the slots having memory modules.

Example 4 includes the apparatus of Example 3, wherein the serial presence detect data is used by a basic input-output system (BIOS) during a startup of the processor.

Example 5 includes the apparatus of any one of Examples 1-4, wherein: the main power rail is among a set of main power rails; and when the number of slots exceeds the threshold and the sleep state is asserted, the logic circuit is to instruct the power supply to turn on the set of main power rails.

Example 6 includes the apparatus of Example 5, further comprising a set of switches responsive to the logic circuit, the set of switches comprising a respective switch coupled to each power rail of the set of main power rails, wherein: each power rail of the set of main power rails provides a different power; the set of switches is to control whether each power rail of the set of main power rails is coupled to respective components on the PCB; and the logic circuit is to turn on the set of switches in an order of an increasing power of the power rails when entering the sleep state from the active state, and in an order of decreasing power of the power rails when entering the active state from the sleep state.

Example 7 includes the apparatus of any one of Examples 1-6, wherein the signal which indicates whether the number of slots exceeds the threshold overrides an ability of the sleep state to turn off the power supply.

Example 8 includes the apparatus of any one of Examples 1-7, wherein the sleep state is an S3 state and the active state is an S0 state.

Example 9 includes an apparatus, comprising: a power supply comprising an auxiliary power rail and a main power rail, wherein a plurality of components are to be powered by the power supply, including a processor, one or more non-critical components which are to be powered during an active state but not a sleep state of the processor, and one or more critical components which are to be powered during the active state and the sleep state of the processor, wherein the processor is to determine whether a power requirement of the one or more critical components exceeds an available power of the auxiliary power rail; and a switch responsive to the processor to couple the main power rail to the one or more critical components when the processor is in the sleep state and the power requirement exceeds the available power of the auxiliary power rail.

Example 10 includes the apparatus of Example 9, further comprising a logic circuit coupled to the switch, wherein: the logic circuit is responsive to a signal asserted by the processor; the signal indicates whether the power requirement of the one or more critical components exceeds the available power of the auxiliary power rail; and the switch is responsive to the logic circuit.

Example 11 includes the apparatus of Example 9 or 10, further comprising a set of switches responsive to the processor to decouple the main power rail from the one or more non-critical when the processor is in the sleep state and the power requirement exceeds the available power of the auxiliary power rail.

Example 12 includes the apparatus of any one of Examples 9-11, wherein: the one or more critical components comprise memory modules; and to determine the power requirement, the processor is to determine a number of the memory modules.

Example 13 includes the apparatus of any one of Examples 9-12, wherein: the one or more critical components comprise memory modules; and to determine the power requirement, the processor is to determine at least one of a type of each memory module, a number of ranks of each memory module, or a capacity of each memory modules.

Example 14 includes the apparatus of any one of Examples 9-13, wherein: the one or more critical components comprise memory modules; and to determine the power requirement, a basic input-output system (BIOS) is to use serial presence detect data to read information from memory modules.

Example 15 includes an apparatus, comprising: a memory device to store instructions; and a processor to execute the instructions to: detect a number of memory modules on a printed circuit board (PCB), wherein the PCB comprises slots for memory modules, and the processor is to detect a number of the slots having memory modules installed; make a determination of whether a power requirement of the memory modules exceeds a threshold based on the number of memory modules; and assert a signal which indicates whether the power requirement of the memory modules exceeds the threshold.

Example 16 includes the apparatus of Example 15, wherein: the processor is to read information from the memory modules which identify a characteristic of the memory modules; and the determination of whether the power requirement of the memory modules exceeds the threshold is based on the characteristic of the memory modules.

Example 17 includes the apparatus of Example 16, wherein the characteristic comprises a maximum operating frequency of the memory modules.

Example 18 includes the apparatus of Example 16 or 17, wherein the characteristic comprises a capacity of the memory modules.

Example 19 includes the apparatus of any one of Examples 15-18, wherein the memory modules comprise dual inline memory modules.

Example 20 includes the apparatus of any one of Examples 15-19, further comprising a logic circuit coupled to the processor, wherein: the processor is to assert a signal which indicates whether the processor is in a sleep state or active state; and the logic circuit is to control a power supply of the PCB based on the signal which indicates whether the power requirement of the memory modules exceeds the threshold and the signal which indicates whether the processor is in the sleep state or active state.

In the present detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:

a processor on a printed circuit board (PCB), wherein the PCB comprises slots for memory modules, and the processor is to detect a number of the slots having memory modules installed, provide a signal which indicates whether the number of slots exceeds a threshold, and provide a signal which indicates whether a sleep state or active state of the processor is asserted; and a logic circuit coupled to the processor, wherein the logic circuit is responsive to the signals, and when the number of slots exceeds the threshold and the sleep state is asserted, the logic circuit is to instruct a power supply for the PCB to turn on a main power rail of the power supply and instruct a switch to couple the main power rail to the memory modules.

2. The apparatus of claim 1, when the number of slots does not exceed the threshold and the sleep state is asserted, the logic circuit is to turn off the main power rail, and to instruct the switch to couple an auxiliary power rail of the power supply to the memory modules.

3. The apparatus of claim 1, wherein the processor is to use serial presence detect data to detect the number of the slots having memory modules.

4. The apparatus of claim 3, wherein the serial presence detect data is used by a basic input-output system (BIOS) during a startup of the processor.

5. The apparatus of claim 1, wherein:

the main power rail is among a set of main power rails; and when the number of slots exceeds the threshold and the sleep state is asserted, the logic circuit is to instruct the power supply to turn on the set of main power rails.

6. The apparatus of claim 5, further comprising a set of switches responsive to the logic circuit, the set of switches comprising a respective switch coupled to each power rail of the set of main power rails, wherein:

each power rail of the set of main power rails provides a different power;

the set of switches is to control whether each power rail of the set of main power rails is coupled to respective components on the PCB; and the logic circuit is to turn on the set of switches in an order of an increasing power of the power rails when entering the sleep state from the active state, and in an order of decreasing power of the power rails when entering the active state from the sleep state.

7. The apparatus of claim 1, wherein the signal which indicates whether the number of slots exceeds the threshold overrides an ability of the sleep state to turn off the power supply.

8. The apparatus of claim 1, wherein the sleep state is an S3 state and the active state is an S0 state.

9. An apparatus, comprising:

a power supply comprising an auxiliary power rail and a main power rail, wherein a plurality of components are to be powered by the power supply, including a processor, one or more non-critical components which are to be powered during an active state but not a sleep state of the processor, and one or more critical components which are to be powered during the active state and the sleep state of the processor, wherein the processor is to determine whether a power requirement of the one or more critical components exceeds an available power of the auxiliary power rail; and a switch responsive to the processor to couple the main power rail to the one or more critical components when the processor is in the sleep state and the power requirement exceeds the available power of the auxiliary power rail.

10. The apparatus of claim 9, further comprising a logic circuit coupled to the switch, wherein:

the logic circuit is responsive to a signal asserted by the processor;

the signal indicates whether the power requirement of the one or more critical components exceeds the available power of the auxiliary power rail; and the switch is responsive to the logic circuit.

11. The apparatus of claim 9, further comprising a set of switches responsive to the processor to decouple the main power rail from the one or more non-critical when the processor is in the sleep state and the power requirement exceeds the available power of the auxiliary power rail.

12. The apparatus of claim 9, wherein:

the one or more critical components comprise memory modules; and to determine the power requirement, the processor is to determine a number of the memory modules.

13. The apparatus of claim 9, wherein:

the one or more critical components comprise memory modules; and to determine the power requirement, the processor is to determine at least one of a type of each memory module, a number of ranks of each memory module, or a capacity of each memory modules.

14. The apparatus of claim 9, wherein:

the one or more critical components comprise memory modules; and to determine the power requirement, a basic input-output system (BIOS) is to use serial presence detect data to read information from memory modules.

15. An apparatus, comprising:

a memory device to store instructions; and a processor to execute the instructions to:

detect a number of memory modules on a printed circuit board (PCB), wherein the PCB comprises slots for memory modules, and the processor is to detect a number of the slots having memory modules installed;

make a determination of whether a power requirement of the memory modules exceeds a threshold based on the number of memory modules; and assert a signal which indicates whether the power requirement of the memory modules exceeds the threshold; and a logic circuit coupled to the processor, wherein:

the processor is to assert a signal which indicates whether the processor is in a sleep state or active state; and the logic circuit is to control a power supply of the PCB based on the signal which indicates whether the power requirement of the memory modules exceeds the threshold and the signal which indicates whether the processor is in the sleep state or active state.

16. The apparatus of claim 15, wherein:

the processor is to read information from the memory modules which identify a characteristic of the memory modules; and the determination of whether the power requirement of the memory modules exceeds the threshold is based on the characteristic of the memory modules.

17. The apparatus of claim 16, wherein the characteristic comprises a maximum operating frequency of the memory modules.

18. The apparatus of claim 16, wherein the characteristic comprises a capacity of the memory modules.

19. The apparatus of claim 15, wherein the memory modules comprise dual inline memory modules.

* * * * *